(12) United States Patent
Chipman et al.

(10) Patent No.: US 9,477,712 B2
(45) Date of Patent: *Oct. 25, 2016

(54) SEARCHING FOR SEGMENTS BASED ON AN ONTOLOGY

(71) Applicant: Comcast Interactive Media, LLC, Philadelphia, PA (US)

(72) Inventors: Leslie Eugene Chipman, Rockville, MD (US); Evelyne Tzoukermann, Silver Spring, MD (US); Anthony R. Davis, Silver Spring, MD (US); David F. Houghton, Brattleboro, VT (US); Ryan M. Farrell, College Park, MD (US); Hongzhong Zhou, Silver Spring, MD (US); Oliver Jojic, Annandale, VA (US); Vladimir Kronrod, Rockville, MD (US); Bageshree Shevade, Alexandria, VA (US); Geetu Ambwani, Washington, DC (US)

(73) Assignee: Comcast Interactive Media, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/199,063

(22) Filed: Mar. 6, 2014

(65) Prior Publication Data
US 2014/0258284 A1    Sep. 11, 2014

Related U.S. Application Data

(63) Continuation of application No. 12/343,790, filed on Dec. 24, 2008, now Pat. No. 8,713,016.

(51) Int. Cl.
*G06F 17/30* (2006.01)

(52) U.S. Cl.
CPC ..... *G06F 17/3053* (2013.01); *G06F 17/30038* (2013.01)

(58) Field of Classification Search
None
See application file for complete search history.

(56) References Cited

U.S. PATENT DOCUMENTS

| 4,227,177 A | 10/1980 | Moshier |
| 5,493,677 A | 2/1996 | Balogh et al. |

(Continued)

FOREIGN PATENT DOCUMENTS

| CA | 2689376 | 12/2009 |
| CA | 2685833 A1 | 5/2010 |

(Continued)

OTHER PUBLICATIONS

Behrang Mohit and Rebecca Hwa, 2005. Syntax-based Semi-Supervised Named Entity Tagging. In Proceedings of the ACL Interactive Poster and Demonstration Sessions, pp. 57-60.

(Continued)

*Primary Examiner* — Anh Tai Tran
(74) *Attorney, Agent, or Firm* — Banner & Witcoff, Ltd.

(57) ABSTRACT

The invention pertains to methods, systems, and apparatus for identifying media items relevant to a selected subject matter, the method comprising determining the subject matter of a first media item, the first media item comprising at least one of audio content and video content, determining the classification within an ontology of the subject matter of the first media item, analyzing the ontology to identify other subject matter related to the subject matter of the first media item, and performing a search for other media items relevant to the subject matter of the first media item as a function of at least the other related subject matter according to the ontology.

20 Claims, 3 Drawing Sheets

(56) References Cited

U.S. PATENT DOCUMENTS

| | | | |
|---|---|---|---|
| 5,521,841 A | 5/1996 | Arman et al. | |
| 5,530,859 A | 6/1996 | Tobias, II et al. | |
| 5,535,063 A | 7/1996 | Lamming | |
| 5,553,281 A | 9/1996 | Brown et al. | |
| 5,576,755 A | 11/1996 | Davis et al. | |
| 5,594,897 A | 1/1997 | Goffman | |
| 5,640,553 A | 6/1997 | Schultz | |
| 5,649,182 A | 7/1997 | Reitz | |
| 5,666,528 A | 9/1997 | Thai | |
| 5,682,326 A | 10/1997 | Klingler et al. | |
| 5,717,914 A | 2/1998 | Husick et al. | |
| 5,729,741 A | 3/1998 | Liaguno et al. | |
| 5,737,495 A | 4/1998 | Adams et al. | |
| 5,737,734 A | 4/1998 | Schultz | |
| 5,742,816 A | 4/1998 | Barr et al. | |
| 5,761,655 A | 6/1998 | Hoffman | |
| 5,765,150 A | 6/1998 | Burrows | |
| 5,799,315 A | 8/1998 | Rainey et al. | |
| 5,819,292 A | 10/1998 | Hitz et al. | |
| 5,845,279 A | 12/1998 | Garofalakis et al. | |
| 5,857,200 A | 1/1999 | Togawa | |
| 5,924,090 A | 7/1999 | Krellenstein | |
| 5,928,330 A | 7/1999 | Goetz et al. | |
| 5,937,422 A | 8/1999 | Nelson et al. | |
| 5,956,729 A | 9/1999 | Goetz et al. | |
| 5,982,369 A | 11/1999 | Sciammarella et al. | |
| 6,038,560 A | 3/2000 | Wical | |
| 6,052,657 A | 4/2000 | Yamron et al. | |
| 6,055,543 A | 4/2000 | Christensen et al. | |
| 6,058,392 A | 5/2000 | Sampson et al. | |
| 6,167,377 A | 12/2000 | Gillick et al. | |
| 6,188,976 B1 | 2/2001 | Ramaswamy et al. | |
| 6,278,992 B1 | 8/2001 | Curtis et al. | |
| 6,320,588 B1 | 11/2001 | Palmer et al. | |
| 6,343,294 B1 | 1/2002 | Hawley | |
| 6,345,253 B1 | 2/2002 | Viswanathan | |
| 6,363,380 B1 | 3/2002 | Dimitrova | |
| 6,366,296 B1 | 4/2002 | Boreczky et al. | |
| 6,374,260 B1 | 4/2002 | Hoffert et al. | |
| 6,415,434 B1 | 7/2002 | Kind | |
| 6,418,431 B1 | 7/2002 | Mahajan et al. | |
| 6,463,444 B1 | 10/2002 | Jain et al. | |
| 6,545,209 B1 | 4/2003 | Flannery et al. | |
| 6,546,385 B1 | 4/2003 | Mao et al. | |
| 6,567,980 B1 | 5/2003 | Jain et al. | |
| 6,675,174 B1 | 1/2004 | Bolle et al. | |
| 6,698,020 B1 | 2/2004 | Zigmond et al. | |
| 6,771,875 B1* | 8/2004 | Kunieda et al. | 386/241 |
| 6,789,088 B1* | 9/2004 | Lee et al. | 707/741 |
| 6,792,426 B2 | 9/2004 | Baumeister et al. | |
| 6,877,134 B1 | 4/2005 | Fuller et al. | |
| 6,882,793 B1 | 4/2005 | Fu et al. | |
| 6,901,364 B2 | 5/2005 | Nguyen et al. | |
| 6,937,766 B1 | 8/2005 | Wilf et al. | |
| 6,970,639 B1 | 11/2005 | McGrath et al. | |
| 7,177,861 B2 | 2/2007 | Tovinkere et al. | |
| 7,206,303 B2 | 4/2007 | Karas et al. | |
| 7,272,558 B1 | 9/2007 | Soucy et al. | |
| 7,376,642 B2 | 5/2008 | Nayak et al. | |
| 7,472,137 B2 | 12/2008 | Edelstein et al. | |
| 7,490,092 B2 | 2/2009 | Sibley et al. | |
| 7,548,934 B1 | 6/2009 | Platt et al. | |
| 7,584,102 B2 | 9/2009 | Hwang et al. | |
| 7,739,286 B2 | 6/2010 | Sethy et al. | |
| 7,788,266 B2 | 8/2010 | Venkataraman et al. | |
| 7,792,812 B1 | 9/2010 | Carr | |
| 7,814,267 B1 | 10/2010 | Iyengar et al. | |
| 7,921,116 B2 | 4/2011 | Finkelstein et al. | |
| 7,925,506 B2 | 4/2011 | Farmaner et al. | |
| 7,958,119 B2 | 6/2011 | Eggink et al. | |
| 7,983,902 B2 | 7/2011 | Wu et al. | |
| 8,041,566 B2 | 10/2011 | Peters et al. | |
| 8,078,467 B2 | 12/2011 | Wu et al. | |
| 8,117,206 B2 | 2/2012 | Sibley et al. | |
| 8,265,933 B2 | 9/2012 | Bates et al. | |
| 8,527,520 B2 | 9/2013 | Morton et al. | |
| 8,572,087 B1 | 10/2013 | Yagnik | |
| 2001/0014891 A1 | 8/2001 | Hoffert et al. | |
| 2002/0035573 A1 | 3/2002 | Black et al. | |
| 2002/0087315 A1 | 7/2002 | Lee et al. | |
| 2002/0143774 A1 | 10/2002 | Vandersluis | |
| 2002/0194181 A1 | 12/2002 | Wachtel | |
| 2003/0014758 A1* | 1/2003 | Kim | 725/87 |
| 2003/0033297 A1 | 2/2003 | Ogawa | |
| 2003/0050778 A1 | 3/2003 | Nguyen et al. | |
| 2003/0061028 A1 | 3/2003 | Dey et al. | |
| 2003/0093790 A1 | 5/2003 | Logan et al. | |
| 2003/0135582 A1 | 7/2003 | Allen et al. | |
| 2003/0163443 A1 | 8/2003 | Wang | |
| 2003/0163815 A1 | 8/2003 | Begeja et al. | |
| 2003/0195877 A1 | 10/2003 | Ford et al. | |
| 2003/0204513 A1 | 10/2003 | Bumbulis | |
| 2004/0111465 A1 | 6/2004 | Chuang et al. | |
| 2004/0117831 A1 | 6/2004 | Ellis et al. | |
| 2004/0139091 A1 | 7/2004 | Shin | |
| 2004/0215634 A1 | 10/2004 | Wakefield et al. | |
| 2004/0225667 A1 | 11/2004 | Hu et al. | |
| 2004/0243539 A1 | 12/2004 | Skurtovich et al. | |
| 2004/0254795 A1 | 12/2004 | Fujii et al. | |
| 2004/0267700 A1 | 12/2004 | Dumais et al. | |
| 2005/0044105 A1 | 2/2005 | Terrell | |
| 2005/0060647 A1 | 3/2005 | Doan et al. | |
| 2005/0091443 A1 | 4/2005 | Hershkovich et al. | |
| 2005/0097138 A1 | 5/2005 | Kaiser et al. | |
| 2005/0114130 A1 | 5/2005 | Java et al. | |
| 2005/0152362 A1 | 7/2005 | Wu | |
| 2005/0193005 A1 | 9/2005 | Gates et al. | |
| 2005/0222975 A1 | 10/2005 | Nayak et al. | |
| 2006/0037046 A1 | 2/2006 | Simms et al. | |
| 2006/0074671 A1 | 4/2006 | Farmaner et al. | |
| 2006/0088276 A1 | 4/2006 | Cho et al. | |
| 2006/0100898 A1 | 5/2006 | Pearce et al. | |
| 2006/0112097 A1 | 5/2006 | Callaghan et al. | |
| 2006/0156399 A1 | 7/2006 | Parmar et al. | |
| 2006/0161546 A1 | 7/2006 | Callaghan et al. | |
| 2006/0167859 A1 | 7/2006 | Verbeck Sibley et al. | |
| 2006/0212288 A1 | 9/2006 | Sethy et al. | |
| 2006/0235843 A1 | 10/2006 | Musgrove et al. | |
| 2006/0253780 A1 | 11/2006 | Munetsugu et al. | |
| 2006/0256739 A1 | 11/2006 | Seier et al. | |
| 2007/0011133 A1 | 1/2007 | Chang | |
| 2007/0050343 A1 | 3/2007 | Siddarampappa et al. | |
| 2007/0050366 A1 | 3/2007 | Bugir et al. | |
| 2007/0067285 A1 | 3/2007 | Blume et al. | |
| 2007/0078708 A1 | 4/2007 | Yu et al. | |
| 2007/0083374 A1 | 4/2007 | Bates et al. | |
| 2007/0156677 A1 | 7/2007 | Szabo | |
| 2007/0208567 A1 | 9/2007 | Amento et al. | |
| 2007/0211762 A1 | 9/2007 | Song et al. | |
| 2007/0214123 A1 | 9/2007 | Messer et al. | |
| 2007/0214488 A1 | 9/2007 | Nguyen et al. | |
| 2007/0233487 A1 | 10/2007 | Cohen et al. | |
| 2007/0233656 A1 | 10/2007 | Bunescu et al. | |
| 2007/0239707 A1 | 10/2007 | Collins et al. | |
| 2007/0250901 A1 | 10/2007 | McIntire et al. | |
| 2007/0260700 A1 | 11/2007 | Messer | |
| 2007/0271086 A1 | 11/2007 | Peters et al. | |
| 2008/0033915 A1 | 2/2008 | Chen et al. | |
| 2008/0046929 A1 | 2/2008 | Cho et al. | |
| 2008/0059418 A1 | 3/2008 | Barsness et al. | |
| 2008/0091633 A1 | 4/2008 | Rappaport et al. | |
| 2008/0113504 A1 | 5/2008 | Lee et al. | |
| 2008/0118153 A1 | 5/2008 | Wu et al. | |
| 2008/0133504 A1 | 6/2008 | Messer et al. | |
| 2008/0162533 A1 | 7/2008 | Mount et al. | |
| 2008/0163328 A1 | 7/2008 | Philbin et al. | |
| 2008/0168045 A1 | 7/2008 | Suponau et al. | |
| 2008/0183681 A1 | 7/2008 | Messer et al. | |
| 2008/0183698 A1 | 7/2008 | Messer et al. | |
| 2008/0189110 A1 | 8/2008 | Freeman et al. | |
| 2008/0204595 A1 | 8/2008 | Rathod et al. | |
| 2008/0208796 A1 | 8/2008 | Messer et al. | |
| 2008/0208839 A1 | 8/2008 | Sheshagiri et al. | |
| 2008/0208864 A1 | 8/2008 | Cucerzan et al. | |

(56) References Cited

U.S. PATENT DOCUMENTS

| | | |
|---|---|---|
| 2008/0221989 A1 | 9/2008 | Messer et al. |
| 2008/0222105 A1 | 9/2008 | Matheny |
| 2008/0222106 A1 | 9/2008 | Rao et al. |
| 2008/0222142 A1 | 9/2008 | O'Donnell |
| 2008/0235209 A1 | 9/2008 | Rathod et al. |
| 2008/0235393 A1 | 9/2008 | Kunjithapatham et al. |
| 2008/0250010 A1 | 10/2008 | Rathod et al. |
| 2008/0256097 A1 | 10/2008 | Messer et al. |
| 2008/0266449 A1 | 10/2008 | Rathod et al. |
| 2008/0281801 A1 | 11/2008 | Larson et al. |
| 2008/0288641 A1 | 11/2008 | Messer et al. |
| 2008/0319962 A1 | 12/2008 | Riezler et al. |
| 2009/0006315 A1 | 1/2009 | Mukherjea et al. |
| 2009/0006391 A1 | 1/2009 | Ram |
| 2009/0013002 A1 | 1/2009 | Eggink et al. |
| 2009/0025054 A1 | 1/2009 | Gibbs et al. |
| 2009/0055381 A1 | 2/2009 | Wu et al. |
| 2009/0077078 A1 | 3/2009 | Uppala et al. |
| 2009/0083257 A1 | 3/2009 | Bargeron et al. |
| 2009/0094113 A1 | 4/2009 | Berry et al. |
| 2009/0123021 A1 | 5/2009 | Jung et al. |
| 2009/0144260 A1 | 6/2009 | Bennett et al. |
| 2009/0144609 A1 | 6/2009 | Liang et al. |
| 2009/0157680 A1 | 6/2009 | Crossley et al. |
| 2009/0172544 A1 | 7/2009 | Tsui et al. |
| 2009/0198686 A1 | 8/2009 | Cushman, II et al. |
| 2009/0204599 A1 | 8/2009 | Morris et al. |
| 2009/0205018 A1 | 8/2009 | Ferraiolo et al. |
| 2009/0240650 A1 | 9/2009 | Wang et al. |
| 2009/0240674 A1 | 9/2009 | Wilde et al. |
| 2009/0271195 A1 | 10/2009 | Kitade et al. |
| 2009/0282069 A1 | 11/2009 | Callaghan et al. |
| 2009/0326947 A1 | 12/2009 | Arnold et al. |
| 2010/0042602 A1 | 2/2010 | Smyros et al. |
| 2010/0070507 A1 | 3/2010 | Mori |
| 2010/0094845 A1 | 4/2010 | Moon et al. |
| 2010/0138653 A1 | 6/2010 | Spencer et al. |
| 2010/0250598 A1 | 9/2010 | Brauer et al. |
| 2011/0004462 A1 | 1/2011 | Houghton et al. |
| 2011/0016106 A1 | 1/2011 | Xia |
| 2011/0077943 A1 | 3/2011 | Miki et al. |
| 2011/0125728 A1 | 5/2011 | Smyros et al. |
| 2011/0191099 A1 | 8/2011 | Farmaner et al. |
| 2011/0246503 A1 | 10/2011 | Bender et al. |
| 2012/0036119 A1 | 2/2012 | Zwicky et al. |
| 2012/0078932 A1 | 3/2012 | Skurtovich, Jr. et al. |
| 2012/0150636 A1 | 6/2012 | Freeman et al. |
| 2012/0191695 A1 | 7/2012 | Xia |
| 2013/0054589 A1 | 2/2013 | Cheslow |

FOREIGN PATENT DOCUMENTS

| | | |
|---|---|---|
| EP | 1241587 A1 | 9/2002 |
| EP | 1462950 A1 | 9/2004 |
| EP | 1501305 A1 | 1/2005 |
| EP | 09180762.8 | 12/2009 |
| GB | 2448874 A | 11/2008 |
| GB | 2448875 A | 11/2008 |
| WO | 9950830 A1 | 10/1999 |
| WO | 0205135 A2 | 1/2002 |
| WO | 2005/050621 A2 | 6/2005 |
| WO | 2006099621 A2 | 9/2006 |
| WO | 2007115224 A2 | 10/2007 |
| WO | 2008053132 A1 | 5/2008 |
| WO | 2009052277 A1 | 4/2009 |

OTHER PUBLICATIONS

Shumeet Baluja, Vibhu Mittal and Rahul Sukthankar, 1999. Applying machine learning for high performance named-entity extraction. In Proceedings of Pacific Association for Computational Linguistics.

R. Bunescu and M. Pasca. 2006. Using encyclopedic knowledge for named entity disambiguation. In Proceedings of EACL-2006, pp. 9-16.

S. Cucerzan. 2007. Large-Scale Named Entity Disambiguation Based on Wikipedia Data. In Proceedings of EMNLP-CoNLL 2007, pp. 708-716.

Radu Florian, 2002. Named entity recognition as a house of cards: Classifier stacking. In Proceedings of CoNL2002, pp. 175-178.

Martin Jansche, 2002. Named Entity Extraction with Conditional Markov Models and Classifiers. In Proceedings of CoNLL-2002.

Thamar Solorio, 2004. Improvement of Named Entity Tagging by Machine Learning. Reporte Tecnico No. CCC-04-004. INAOE.

European Examination—EP Appl. 09180762.8—Dated Jan. 19, 2015.

Shahraray: "Impact and Applications of Video Content Analysis and Coding in the internet and Telecommunications", AT&T Labs Research, A Position Statement for Panel 4: Applications the 1998 International Workshop on Very Low Bitrate Video Coding, 3 pages.

Kalina Bontcheva et al "Shallow Methods for Named Entity Coreference Resolution", Proc. of Taln 2002, Jan. 1, 2002.

Raphael Volz et al., "Towards ontologybased disambiguation of geographical identifiers", Proceedings of the WWW2007 Workshop I3: Identity, Identifiers, Identification, Entity-Centric Approaches to Information and Knowledge Management on the Web, Jan. 1, 2007.

Wacholder N et al., "Disambiguation of Proper Names in Text", Proceedings of the Conference on Applied Natural Language Processing, Association Computer Linguistics, Morrisontown, NJ, Mar. 1, 2007.

Boulgouris N. V. et al., "Real-Time Compressed-Domain Spatiotemporal Segmentation and Ontologies for Video Indexing and Retrieval", IEEE Transactions on Circuits and Systems for Video Technology, vol. 14, No. 5, pp. 606-621, May 2004.

Changsheng Xu et al., "Using Webcast Text for Semantic Event Detection in Broadcast Sports Video", IEEE Transactions on Multimedia, vol. 10, No. 7, pp. 1342-1355, Nov. 2008.

Liang Bai et al., "Video Semantic Content Analysis based on Ontology", International Machine Vision and Image Processing Conference, pp. 117-124, Sep. 2007.

Koskela M. et al., "Measuring Concept Similarities in Multimedia Ontologies: Analysis and Evaluations", IEEE Transactions on Multimedia, vol. 9, No. 5, pp. 912-922, Aug. 2007.

Steffen Staab et al., "Semantic Multimedia", Reasoning Web; Lecture Notes in Computer Science, pp. 125-170, Sep. 2008.

European Search Report EP09179987.4, dated Jun. 4, 2010.

Li, Y. et al., "Reliable Video Clock Time Recognition," Pattern Recognition, 2006, 1CPR 1006, 18th International Conference on Pattern Recognition, 4 pages.

Salton et al., Computer Evaluation of Indexing and Text Processing Journal of the Association for Computing Machinery, vol. 15, No. 1, Jan. 1968, pp. 8-36.

European Search Report for Application No. 09180776.8, mailed Jun. 7, 2010, 9 pages.

European Search Report EP 09180762, dated Mar. 22, 2010.

European Application No. 09175979.5—Office Action mailed Mar. 15, 2010.

EP Application No. 09 175 979.5—Office Action mailed Apr. 11, 2011.

Smith, J.R. et al., "An Image and Video Search Engine for the World-Wide Web" Storage and Retrieval for Image and Video Databases 5, San Jose, Feb. 13-14, 1997, Proceedings of Spie, Belingham, Spie, US, vol. 3022, Feb. 13, 1997, pp. 84-95.

Kontothoanassis, Ledonias et al. "Design, Implementation, and Analysis of a Multimedia Indexing and Delivery Server", Technical Report Series, Aug. 1999, Cambridge Research Laboratory.

European Patent Application No. 09175979.5—Office Action dated Dec. 13, 2011.

International Preliminary Examination Report for PCT/US01/20894, dated Feb. 4, 2002.

Towards a Multimedia World-Wide Web Information retrieval engines, Sougata Mukherjea, Kyoji Hirata, and Yoshinori Hara Computer Networks and ISDN Systems 29 (1997) 1181-1191.

Experiments in Spoken Document Retrieval at CMU, M.A. Siegler, M.J. Wittbrock, S.T. Slattery, K. Seymore, R.E. Jones, and A.G.

(56) References Cited

OTHER PUBLICATIONS

Hauptmann, School of Computer Science Carnegie Mellon University, Pittsburgh, PA 15213-3890, Justsystem Pittsburgh Research Center, 4616 Henry Street, Pittsburgh, PA 15213.
Eberman, et al., "Indexing Multimedia for the Internet", Compaq, Cambridge Research laboratory, Mar. 1999, pp. 1-8 and Abstract.
Ishitani, et al., "Logical Structure Analysis of Document Images Based on Emergent Computation", IEEE Publication, pp. 189-192, Jul. 1999.
First Office Action in EP01950739.1-1244 dated Mar. 27, 2009.
Chen, "Extraction of Indicative Summary Sentences from Imaged Documents", IEEE publication, 1997, pp. 227-232.
Hsin-Min Wang and Berlin Chen, "Content-based Language Models for Spoken Document Retrieval", ACM, 2000, pp. 149-155.
Marin, Feldman, Ostendort and Gupta, "Filtering Web Text to Match Target Genres", International Conference on Acoustics, Speech and Signal Processing, 2009, Piscataway, NJ, Apr. 19, 2009, pp. 3705-3708.
European Search Report for application No. 10167947.0, mailed Sep. 28, 2010.
"Ying Zhang and Phil Vines. 2004. Using the web for automated translation extraction in cross-language information retrieval. In Proceedings of the 27th annual international ACM SIGIR conference on Research and development in information retrieval (SIGIR '04). ACM, New York, NY, USA, 162-169".
IPRP PCT/US2009/069644—Jun. 29, 2011.
ISR PCT/US2009/069644—Mar. 4, 2010.
ESR—EP10154725.5—Nov. 2, 2010.
ESR—EP10155340.2—Nov. 25, 2010.
Partial ESR—EP10155340.2—Jul. 12, 2010.
ESR—EP10162666.1—Aug. 4, 2011.
ESR—EP10167947.0—Sep. 28, 2010.
ISR PCT/US2001/020894—Nov. 25, 2003.
Extended European Search Report—EP 09815446.1—mailing date: May 7, 2013.
Canadian Patent Application No. 2,685,833—Office Action dated Jan. 20, 2012.
European Office Action—EP 10154725.5—Dated Apr. 24, 2015.
Chen, Langzhou, et al. "Using information retrieval methods for language model adaptation." INTERSPEECH. 2001.
Sethy, Abhinav, Panayiotis G. Georgiou, and Shrikanth Narayanan. "Building topic specific language models from webdata using competitive models." INTERSPEECH. 2005.
Response to European Office Action—EP Appl. 9180762.8—Submitted Jul. 29, 2015.
European Office Action—EP Appl. 10162666.1—dated Jul. 10, 2015.
Response to European Office Action—EP 10162666.1—Dated Oct. 14, 2015.
Response to European Office Action—EP Appl. 10154725.5—submitted Oct. 14, 2015.
Canadian Office Action—CA Application 2,697,565—dated Dec. 15, 2015.
Messer, Alan et al., "SeeNSearch: A context Directed Search Facilitator for Home Entertainment Devices", Paper, Samsung Information Systems America Inc., San Jose, CA, Sep. 17, 2008.
European Office Action—EP Appl. 09815446.1—dated Feb. 17, 2016.
Canadian Office Action—CA Appl. 2,688,921—mailed Feb. 16, 2016.
Canadian Office Action—CA Appl. 2,703,569—dated Apr. 19, 2016.
Canadian Office Action—CA Appl. 2,708,842—dated May 9, 2016.
Canadian Office Action—CA Appl. 2,694,943—dated Jun. 1, 2016.
Canadian Office Action—CA App 2,695,709—dated Jun. 20, 2016.

* cited by examiner

SEARCHING FOR SEGMENTS BASED ON AN ONTOLOGY

CROSS-REFERENCE TO RELATED APPLICATIONS

This application is a continuation of co-pending U.S. application Ser. No. 12/343,790, filed on Dec. 24, 2008, which is incorporated herein by reference in its entirety.

FIELD OF THE INVENTION

The invention pertains to a process and apparatus for organizing segments of audio, video, and media files and determining the relevance of such segments to each other or to a query.

BACKGROUND OF THE INVENTION

Until fairly recently, individuals consumed audio, video, and other media content in relatively few forms (television, movies, musical albums) from relatively few sources (television stations, movie theaters, radio stations, CDs). However, with the advent of the Internet and an explosion in the availability of low cost electronic consumer products, the forms and potential sources of such content have become much more numerous. Today, individuals can consume such content on computers at home via the internet, on any number of portable devices with memory for storing content, on mobile devices with wireless network connectivity to content, on televisions, in movie theaters, etc. Furthermore, the potential sources of audio, video, and multimedia content are virtually limitless. For instance, subscription-based television network systems, such as cable television, now provide video on demand offering in addition to standard broadcast television. They also allow subscribers to record broadcast television programs and watch them at a time of their own choosing and with the ability to control the content stream, such as by fast forward, skip, pause, rewind, etc.

Even further, almost anyone with a computer can now create and widely publish their own audio, video, and multimedia content on the Internet through such outlets as podcasts, videos published via websites such as myspace-.com or youtube.com. Accordingly, both the amount of available content and the specificity of the content has increased dramatically.

As both the volume and specificity of audio, video, and media content increase, it is expected that consumers will increasingly consume such content, including television programs, movies, music videos, podcasts, musical albums, and other audio, video, and multimedia assets at the sub-asset level. That is, for instance, rather than watching an entire baseball game, a consumer may watch only the parts where the team that he roots for is at bat or may only watch a highlight reel of the game. In another example, a viewer may view only the light saber fight scenes from the Star Wars movie series. In yet other examples, a viewer may watch only the sports segment or the weather segment of the evening news program or listen to only a single song from a CD or album.

Presently, the only way a consumer of media content can access a segment of particular interest to that consumer within a media asset is to scan through the asset in a linear fashion, such as by using a fast-forward or rewind function of a media player, to find the desired content.

"Media" refers to the forms in which content may be transmitted. Presently, the most common transmitted media are audio (e.g., music, speech) and visual (photographs, drawings, motion pictures, web pages, animation). These media are typically represented in electronic formats, such as, for example, HTTP, NNTP, UDP, JMS, TCP, MPEG, MP3, wave files, HTML, JPEG, TIFF, and PDF. As transmission technologies become more advanced, however, transmitted media will likely involve other sensory data such as taste, smell and touch.

The decision as to which segments within a complete media item any individual wishes to view, of course, is based on the subject matter of the content of the segment, hereinafter termed contextual information or subject matter. "Contextual information" or "subject matter" refers broadly to the topic or theme of the content and can be virtually anything within the realm of human knowledge, such as baseball, strike out, fast ball, stolen base, mountains, scary, happy, George Carlin, nighttime, cool, winner. The nature and duration of each segment will depend, of course, on the particular ontology.

Furthermore, as is well-known, advertisers often purchase advertisement time or space within media assets such as television programs, web pages, podcasts, and radio programs based on the subject matter of the media. Specifically, advertisers commonly are interested in a particular demographic of media consumers that can range from the very broad to the extremely narrow. For instance, a producer of beer might be interested in a demographic of male media consumers aged 18-45, whereas a producer of anti-aging face cream for women might be interested in a demographic comprising female viewers aged 30-70. The subject matter of a media asset often has a very high correlation to a specific demographic. Therefore, the producer of anti-aging face cream may be much more interested in placing its advertisement in the middle of a soap opera rather than a football competition because the soap opera will be viewed by many more individuals within the demographic that is likely to buy its product than the football competition, even if the football competition has a much larger overall viewing audience than the soap opera.

Thus, not only do individuals expend a significant amount of effort selecting which media assets they consume, but a great deal of effort is expended by media content providers, (e.g., individual television and radio stations, cable, fiber optic and satellite subscription-based television network operators, internet service providers), media content producers (e.g., television and radio program producers, podcasters, website operators) and advertisers in determining what subject matters of such media appeal to particular demographics for advertisement placement and other purposes.

SUMMARY OF THE INVENTION

The invention pertains to methods, systems, and apparatus for identifying media items relevant to a subject matter of a first media item, the method comprising determining the subject matter of a first media item, the first media item comprising at least one of audio content and video content, determining a classification within an ontology of the subject matter of the first media item, using the ontology to infer other subject matter related to the determined subject matter of the first media item, and performing a search for other media items relevant to the determined subject matter of the first media item as a function of at least the other, related subject matter.

DETAILED DESCRIPTION OF THE INVENTION

Figure 1:
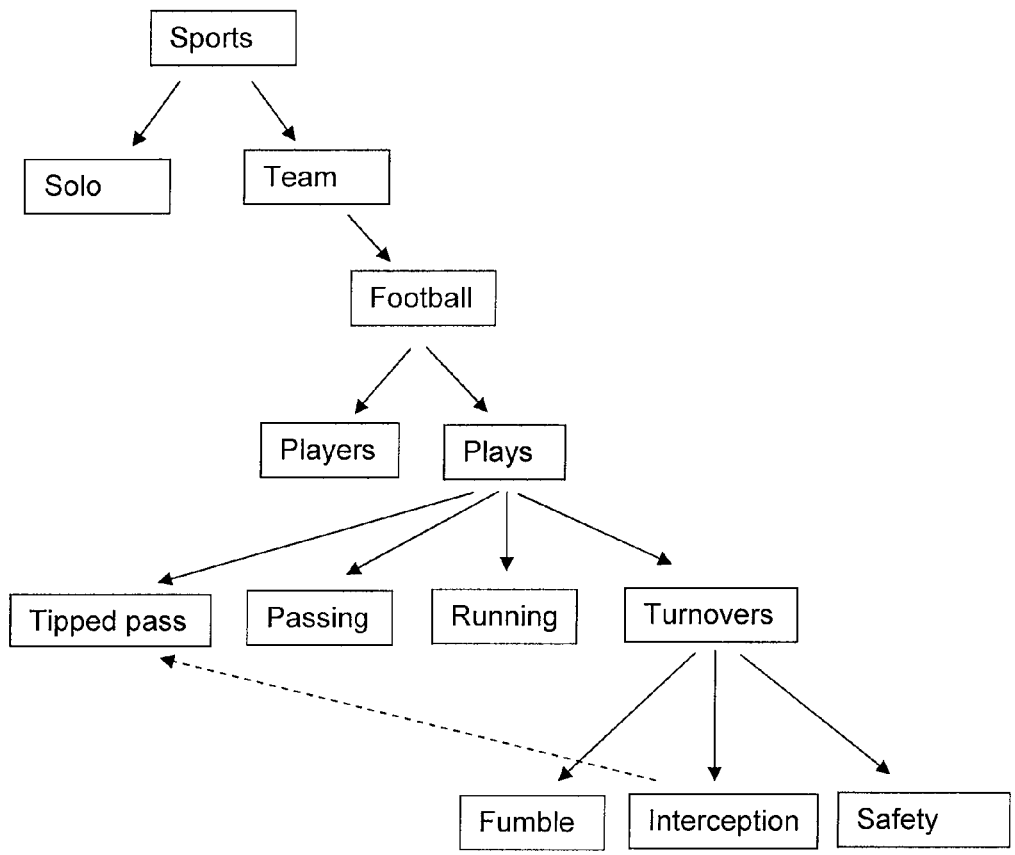
FIG. 1 is a diagram illustrating a portion of an ontology in accordance with an embodiment of the present invention.

Consumers of media content such as television programs, radio programs, videos, podcasts, digitally recorded music, and web pages will increasingly desire functionality for finding media content relevant to a particular interest of the consumer, particularly at the sub-asset level.

"Media" refers to the forms in which content may be transmitted. Presently, the most common transmitted media are audio (e.g., music, speech) and visual (photographs, drawings, motion pictures, web pages, animation). These media are typically represented in electronic formats, such as, for example, HTTP, NNTP, UDP, JMS, TCP, MPEG, MP3, wave files, HTML, JPEG, TIFF, and PDF. As transmission technologies become more advanced, however, transmitted media will likely involve other sensory data such as taste, smell and touch.

As an example, it is envisioned that media content providers and producers, such as subscriber-based television network operators (e.g., cable, satellite and fiber optic television network operators), web site operators, podcasters, etc., eventually will offer all or most of the media content (e.g., television programs, radio programs, videos, digitally recorded music, podcasts, etc.), to consumers on an on-demand basis (i.e., a consumer can consume any media items at any time of his or her choosing, rather than having to wait for a particular broadcast time). This already is the consumption paradigm for most web sites and podcasters. Furthermore, many subscriber-based television networks already provide search and/or browse functions that allow their subscribers to search for media content. For instance, Video-On-Demand (VOD) is a very popular service offered by many subscription television networks. Video-On-Demand is a service by which subscribers may choose programs from a menu for viewing at a time of each individual subscriber's choosing. A subscriber simply selects a program for viewing from a menu of programs that are available for viewing. The program, which is stored in memory at the headend or another server-side node of the network is then streamed to the subscriber's set top box immediately for viewing at that time.

Media items are typically offered by programmers and network operators in generally predefined portions herein termed assets. For instance, television programs such as dramas, soap operas, reality shows, and sitcoms are typically broadcast in asset level units known as episodes that commonly are a half hour or an hour in length (including advertisements). Sporting events are broadcast in asset units of a single game. Music videos are commonly offered in asset units corresponding to a complete song or a complete concert performance.

In the television arts, professionals on the business side of the art tend to refer to these as "assets," whereas professionals on the research and technical side of the art more often refer to them as "documents." In either event, the concept of a media "asset" or "document" is well understood in the industry as well as among content consumers (who may not necessarily know the term "document" or "asset," but know the concept). For instance, a typical television guide printed in a newspaper or the electronic program guides commonly provided by a subscriber-based television network are well known to virtually all television viewers and generally list multimedia content at the asset level.

As both the volume and specificity of media content increases, it is expected that consumers will increasingly consume media at the sub-asset level. That is, for instance, rather than watching an entire baseball game (a media asset), a consumer may watch only the parts where the team that he roots for is at bat or may only watch a highlight reel of the game (a sub-asset level segment). In another example, a viewer may view only the light saber fight scenes from the Star Wars movie series. Likewise, advertisers would be interested in buying advertising time within television content at the sub-asset level based on the subject matter of particular media segments. "Content" refers broadly to the information contained in the signal transmitted, and includes, for example, entertainment, news, and commercials.

A media asset typically can conceptually be broken down into a plurality of segments at the sub-asset level, each having a cohesive subject or theme. The nature and duration of each segment will depend, of course, on the particular ontology used for purposes of segmentation as well as on the particular content of each program. For instance, most stage plays and motion pictures readily break down into two or three acts. Each such act can be a different segment. Television programs also can be segmented according to thematic elements. Certain programs, for instance, the television news magazine program 60 Minutes can readily be segmented into different news stories. Other programs, however, can be segmented based on more subtle thematic elements. A baseball game can be segmented by inning or at-bats, for instance. A typical James Bond movie can be segmented into a plurality of action segments, a plurality of dramatic segments, and a plurality romantic segments. The possibilities for segmentation based on thematic elements is virtually limitless and these are only the simplest of examples.

Presently, consumers of media can search for media content of interest to them on the Internet through various search engines by entering a search string including terms that the consumer believes to be relevant to the type of subject matter for which he or she is searching. Such functionality also is available in most subscriber-based television networks (e.g., cable television, fiber optic, and satellite based television networks) for searching for television programming. However, in many systems, the search functionality is quite limited as compared to Internet search engines. For instance, some systems allow only literal title searching.

Even with a robust Internet search engine, the search results often are not exactly what the consumer was seeking. This can be for several reasons. First, the consumer may simply have put in a poorly chosen search string of terms which returns results that are not relevant to the subject matter for which the consumer is looking. Second, a good search strategy may return results that are relevant to the subject matter of interest, but are too numerous to be useful to the consumer.

Furthermore, automatic initiation and/or formulation of searches for content relevant to a particular subject matter will become increasingly common in the future. Particularly, a media content provider (be it a cable, satellite, or fiber optic television network operator, a Web site operator, a podcast provider, etc.) may wish to provide a feature to its users whereby a consumer can press a button while consuming particular media content and be presented with a user interface within which the user is presented a menu of other content available on the network (preferably at the segment level) having similar or related subject matter. For instance, U.S. patent application Ser. No. 12/343,786, filed on Dec. 24, 2008, and entitled "Method and Apparatus for Advertising at the Sub-Asset Level" and U.S. patent application Ser. No. 12/343,779, filed on Dec. 24, 2008, and entitled "Identification of Segments Within Audio, Video, and Multimedia Items" and U.S. patent application Ser. No. 12/274,452, filed on Nov. 20, 2008, and entitled "Method and Apparatus for Delivering Video and Video-Related Content at Sub-Asset Level" are all owned by the same assignee as the present application, and are all incorporated herein fully by reference, and discuss various aspects of one such system.

For instance, above noted U.S. patent application Ser. No. 12/274,452 particularly discusses an automated search function that can be offered to media consumers in the midst of consuming (e.g., viewing) one media asset (or segment thereof) that will search for other media items (assets, segments at the sub-asset level, or other items) that are pertinent to the subject matter of the media item being consumed. More particularly, a user of an information network is offered supplemental content, the supplemental content being selected based at least partially on the subject matter of the media currently being consumed by the user. "Information network" refers to a collection of devices having a transport mechanism for exchanging information or content between the devices. Such networks may have any suitable architecture, including, for example, client-server, 3-tier architecture, N-tier architecture, distributed objects, loose coupling, or tight coupling.

For instance, an exemplary embodiment of such a system might be implemented as part of the services offered to subscribers of a cable television network or as a feature on a website. Let us consider as an example an individual consumer who is watching a particular television program, in this example, a major league baseball game between the Philadelphia Phillies and the New York Mets. The consumer is permitted at any time during the program to activate a supplemental content search feature, such as by depressing a dedicated button on a remote control unit or mouse clicking on an icon positioned somewhere on a computer monitor. When the feature is thus selected, the set top box (STB), for instance, sends a signal upstream to a server requesting invocation of the feature. In response, the server performs a search for supplemental content that pertains to the particular media content being consumed by that consumer at that time and presents a list of such supplemental content to the viewer via a suitable user interface through which the viewer may select one or more for viewing.

Aforementioned U.S. patent application Ser. No. 12/343,786 and U.S. patent application Ser. No. 12/343,779 collectively disclose techniques and apparatus for segmenting media items (such as media assets) into smaller segments (such as sub-assets), determining the boundaries and subject matter of contextually cohesive segments of the items, and classifying and organizing the segments for searching and browsing according to an ontology. The context being referred to in the terms "contextual information" and "contextually cohesive" is the ontology within which the subject matter of the media content is being classified.

More particularly, U.S. patent application Ser. No. 12/343,779 provides a system for automatically identifying contextually cohesive segments, within media items (e.g., media assets) This task includes both identifying the beginnings and ends of such segments as well as the subject matter of the segments.

As noted above, searching for media content pertinent to a particular topic, be it a search query manually generated by a user or an automated search for other media items related to the subject matter of a first media item, such as disclosed in aforementioned U.S. patent application Ser. No. 12/274,452, is an imperfect science. Typically, search engines search for content based on key words. In the latter example of an automated search for additional media items pertinent to the subject matter of a first media item, aforementioned U.S. patent application Ser. Nos. 12/343,786 and 12/343,779 disclose suitable techniques for implementing such a system. One way of searching such content is to design a system that determines key words and other subject matter cues within the first media item using a number of techniques such as analyzing the closed caption stream, optical character recognition, video analytics, metadata analysis, etc., and then form a search string comprising those keywords for input into a search engine. The search engine may search for media content on the Internet and/or on a private network, such as a cable television network. For instance, a cable television service provider may search through its own database of television programming content (e.g., that has previously been analyzed for subject matter) for other media assets or segments in which those same keywords appear. The results might be weighed and ordered as a function of the number of times the keywords appear, the number of different keywords that appear and/or other criteria.

The quality of the search results, i.e., the pertinence of the results to the subject matter of the first media item, will depend on many factors, including, but not limited to, (1) the quality of the determination of the subject matter of the first media item, (2) the number of keywords that could be identified, (3) whether any of those keywords have double meanings, (4) the specificity of the keywords, and (5) the quantity of other media items having those keywords therein.

As previously noted, some or all of the results of such a search may not be particularly pertinent to the consumer's interests.

The mere matching of keywords often will not find all of the relevant content or the most relevant content. Particularly, depending on the particular user's interests, segments having very different keywords actually may be closely related depending on the user's viewpoint. The inverse also is true. That is, the identical word may have very different and unrelated meanings in different contexts.

Let us consider an example to illustrate the concept. Suppose a viewer is watching a football game, and particularly the Super Bowl game of 2008 between the New England Patriots and the New York Giants. Let us also assume that a play occurs in which the quarterback for the New England Patriots, Eli Manning, throws an interception. During or immediately after this play, the viewer activates the automated search function with the hope of viewing other plays in which the New England Patriots offensive team turned over the ball to the other team. As anyone with a robust knowledge of the game of football will know, an interception is only one of several ways in which a turnover can occur in a football game. Another way is a fumble. Yet another way is a safety. The above example illustrates an "is a" relationship in the nature of a simple classification system or taxonomy. However, many other important relationships between concepts can be represented in a robust ontology. Such relationship may include "belongs to," "is a part of," and "may include." For instance, a tipped pass often leads to an interception or a near interception (a pass that almost was intercepted). It also allows otherwise ineligible receivers to receive a pass. Accordingly, plays in which a tipped pass occurs and/or an ineligible receiver catches a pass may be a near interception and, therefore, highly relevant to another play that is an interception. Thus, as a practical example, it is quite likely that a contextual analysis of the play in which the interception occurred may yield the keywords "New England Patriots," "Eli Manning," and "interception." A search using these keywords is likely to miss turnovers that occurred as the result of a fumble or safety and near interceptions.

As can be seen from this example, a robust knowledge of football would enable the formulation of a better search for pertinent content. Thus, if the viewer had a robust knowledge of football and entered his own search string, he may have thought of adding the words "fumble," "safety," "tipped pass" and/or "ineligible receiver" to the search string or of including the term "turnover" in addition to or instead of "interception."

The present invention offers a way to improve searches by capitalizing on a robust knowledge of subject matter in connection with specific knowledge domains.

Particularly, aforementioned U.S. patent application Ser. Nos. 12/274,452, 12/343,786 and, 12/343,779 disclose aspects of an exemplary system within which the present invention can be incorporated. In any of the exemplary systems discussed in one or more of these patents, media items (e.g., assets) are partitioned into segments (e.g., sub-assets) having cohesive subject matter. The segments (or at least information about the segments) are stored in a database. The database stores each segment's identity (such as by the identity of the media asset of which it forms a part and the time indexes within that asset of the start and end times of the segment) and its contextual information, e.g., in the form of a plurality of attribute/value pairs, a flat (table) database model of tuples (an ordered list of values), hierarchical data models, or relational data models). For example, an attribute for a segment comprising an at-bat of a baseball game may be "Player at Bat" and the value may be "Jimmie Rollins".

In order to develop such a database 201, an ontology (or classification system) 203 is developed to provide a defined framework for classifying media segments by subject matter. An ontology essentially is a formal representation of a set of concepts within a domain and the relationships between those concepts. It is used to reason about the properties of that domain, and may be used to define the domain. Key elements of an ontology include:
  Classes: sets, collections, concepts, types of objects, or kinds of things;
  Attributes: aspects, properties, features, characteristics, or parameters that objects (and classes) can have;
  Relations: ways in which classes and individuals can be related to one another;
  Restrictions: formally stated descriptions of what must be true in order for some assertion to be accepted as input; and
  Rules: statements in the form of an if-then (antecedent-consequent) sentence that describe the logical inferences that can be drawn from an assertion in a particular form.

Thus, for instance, "an interception is a turnover" is a relationship. Also, "an interception may happen on a tipped pass" also is a relationship. An example of a restriction is "non-eligible receivers can catch a pass only if it is tipped by a defender". An example of a rule is "plays involving ineligible receivers may be near interceptions" and, therefore, may be closely related to an interception.

The segments are then indexed with respect to the ontology. The database can then be searched such as by a keyword search and/or the ontology can be examined for segments relevant to any desired subject matter (i.e., faceted searching). Furthermore, as discussed in detail in aforementioned U.S. patent application Ser. No. 12/343,779, preferably different portions of the ontology related to different knowledge domains are specifically designed as a function of those specific knowledge domains, thus making the ontology even more robust.

A knowledge domain essentially is a high level theme or subject. As used herein, "knowledge domain" refers to a relatively broad category of theme or subject, such as baseball, football, romance, Spanish, music, medicine, law, comedy. The breadth and subject of any knowledge domain within the ontology is entirely within the discretion of its creator. The only requirement is that a knowledge domain have subcategories of subject matter.

The present invention leverages the robust knowledge of subject matter inherently contained in the ontology to provide an improved way of locating media content relevant to a search or another piece of media content. Particularly, the ontology, and particularly, the knowledge domain specific portions of an ontology of a system such as disclosed in aforementioned U.S. patent application Ser. No. 12/343,779 inherently have built-in to them a robust knowledge of various knowledge domains. Accordingly, a process of formulating query search strings incorporating the robust knowledge provided by the ontology is likely to substantially improve the quality of the search results, i.e., return more contextually pertinent results, in most cases.

Indexing segments according to an ontology that has been developed with robust knowledge of the particular knowledge domain of interest, (e.g., football) would disclose the relatedness of the concept of an interception to the concepts of a fumble, a turnover, tipped pass, ineligible receiver, and a safety. Thus, designing a search engine that takes into account related concepts as well as the degree of relatedness in accordance with the structure of the ontology could provide much better results than a conventional search engine that does not take into account the robust knowledge inherent in the ontology, particularly the knowledge domain specific portions of the ontology.

Thus, for instance, in the example above, the ontology for football may include portions such as illustrated in FIG. 1. As can be seen, one portion of the ontology includes a category called "turnovers" and shows that it has subcategories "interception", "fumble", and "safety" (an "is a" relationship in the nature of a simple taxonomy). This type of relationship is visually represented in FIG. 1 by solid lines and a tree structure. The ontology also reveals, for instance, that interception may happen on a tipped pass (the "may happen" relationship being represented by a dashed line). Many other relationship types, rules, restrictions and attributes also may be represented in the ontology. Thus, if a subject matter analysis of the play yields only the word "interception" as a keyword, consultation of the ontology discloses that concept of an "interception" is a type of "turnover" and that the concepts of a "fumble" and a "safety" are sister concepts to the concept of an "interception" because all three are forms of a "turnover." Thus, the search query can be modified to include one or more of "turnover", "fumble", and "safety" as keywords in addition to "interception." The terms "fumble" and "safety" may be weighed lower than the terms "interception" and/or "turnover" so that interceptions are weighted more heavily than fumbles and safeties (since they, obviously, are more closely related to the play in question than a fumble or a safety).

Figure 2:
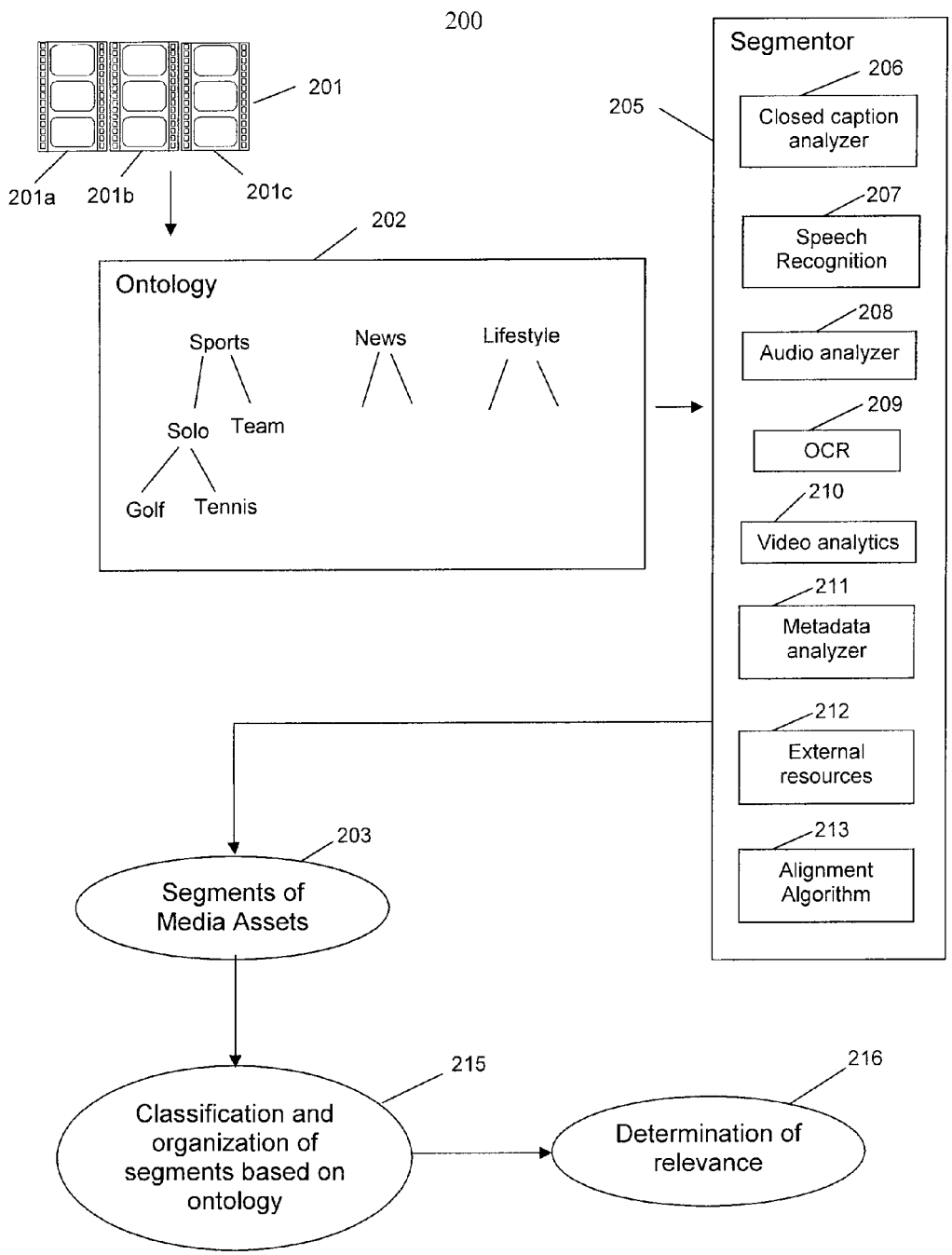
FIG. 2 is a diagram conceptually illustrating components of a system in accordance with an embodiment of the present invention.

FIG. 2 is a block diagram illustrating conceptually the components of an exemplary system 200 incorporating the present invention. A collection of multimedia files (e.g., media assets) 201 exists that can be partitioned into coherent segments (e.g., at the sub-asset level) according to an ontology 202. The segments will be maintained in a segment database 203 that identifies the segments and their subject matter. The identification data for each segment may include, for instance, the identification of the asset of which it forms a part and the time indexes within the asset of the start and end times of the particular segment. The subject matter information may comprise virtually any information about the subject of the segment. The subject matter information in the segment database may be stored as one or more attribute/value pairs. Thus, using as an example, a segment comprising a single play in a football competition, one of the attributes may be "Key Offensive Players" and its value would be assigned the names (or other identification indicia) of the primary offense team players involved in the play.

The ontology as well as the number of attributes and the specific attributes for any given segment can differ as a function of the particular knowledge domain of the asset from which the segment is taken. More specifically, just as mentioned above with respect to the ontology, the particular pieces of contextual information maintained in the database may be specific to the knowledge domain of the media items being segmented. Preferably, the specific knowledge domain is selected as a function of the knowledge domain of the media asset or item that is being segmented. For instance, the attributes stored in connection with a segment that forms part of a football competition may be different than the attributes that are stored for a segment that is part of a baseball competition, which are even further different than the attributes that are stored in connection with a segment that is part of a program about cooking.

Generally, the knowledge domain of most media items is either known in advance of any subject matter analysis of the item (e.g., from the title of the asset) or is easily determinable via an initial subject matter analysis. The knowledge domain of the item may be input manually by a human operator. Alternately, it may be derived by analysis of the title of the asset. This can be done, for instance, by keyword analysis within the title or by comparing the title against a database of known program titles correlated to their knowledge domains. In any event, once the knowledge domain of the media item is determined (e.g., football, baseball, sitcom, reality show, reality competition, game show, etc.), the specific pieces of information determined and stored with respect to a segment (i.e., the attribute/value pairs stored in the segment database 203) also can be customized as a function of the specific knowledge domain of the item of which it forms a part (or the predicted interests of a particular demographic).

Thus, for instance, continuing with the football competition example, the attributes for segments of a football competition may include Team On Offense, Team On Defense, Game Time, Down Number, Key Offensive Players, Key Defensive Players, Type of Play (e.g., kick off, point after attempt, punt regular play), Yards Gained/Lost, etc.

On the other hand, the attributes for segments forming a portion of a baseball competition may be substantially different.

In short, the attributes that are to be stored in the database for a given segment may differ depending on the knowledge domain of the asset from which the segment is taken. Specialized attribute sets may be designed for the most common, relevant or popular knowledge domains for the given population of media assets to be segmented.

Thus, in a preferred embodiment of the invention, a plurality 206-213 of different subject matter gathering processes 206-213 are utilized to determine the boundaries and subject matter of cohesive segments of the media assets 201.

The process of identifying contextually cohesive segments of multimedia assets segmentation process 205 has at least two parts, namely, (1) identifying cohesive, meaningful segments within media items (e.g., identifying the beginning and end of a meaningful segment having a cohesive theme or subject) and (2) identifying that subject. Particularly, identifying keywords or other thematic elements in a multimedia file in order to identify subject matter is only half the battle. Delimiting the segments, i.e., determining the boundaries (beginning and end) of a cohesive segment is an additional complexity.

Various technologies, generally represented within segmentor 205 in FIG. 2 may be utilized for determining the subject matter of media items, such as assets, and partitioning them into coherent segments as a function of their subject matter.

Many technologies are available now that can be adapted for use for identifying media segments either as stand-alone components or in combination within the present invention. For instance, software 206 is now available that can capture the closed caption stream within a media asset and analyze it for subject matter. Further, software 207 is available that can analyze the audio portion of a multimedia stream and detect speech within the audio stream and convert the speech to text (which can further be analyzed for subject matter, just like the closed caption stream).

In fact, voice recognition software can be used to detect the identity of a particular speaker within a media stream. For instance, certain types of multimedia files, such as television programs of a particular title (e.g., "60 Minutes" or "Seinfeld") have a known set of individuals that are likely to speak during the program. In 60 Minutes, for instance, it would be the handful of reporters that regularly host segments of the program. In "Seinfeld", it would be one of the handful of main characters—Jerry Seinfeld (played by actor Jerry Seinfeld), Elaine Benes played by actor Julia Louis-Dreyfus), Cosmo Kramer (played by actor Michael Richards), and George Costanza (played by actor Jason Alexander). Such software can be pre-programmed to recognize the voices of those main characters/actors and then used to recognize those voices to provide even richer subject matter data.

Additionally, audio analytics software 208 is now available that can analyze the non-speech aspects of the audio stream of an audio or multimedia file to determine additional subject matter information from sounds other than speech. For instance, such software can detect, recognize, and distinguish between, for instance, the sound of a crowd cheering or booing, sounds associated with being outdoors in a natural setting or being outdoors in an urban setting, or being indoors in a factory or an office or a residence, etc. For example, U.S. Pat. No. 7,177,881 discloses suitable software for detecting semantic events in an audio stream.

Even further, optical character recognition software 209 can be used to determine text that appears in a scene. See, e.g. Li, Y. et al. "Reliable Video Clock Recognition," Pattern Recognition, 2006, 1CPR 2006, 18$^{th}$ International Conference on Pattern Recognition. Such software can be used, for instance, to detect the clock in a timed sporting event. Specifically, knowledge of the game time could be useful in helping determine the nature of a scene. For instance, whether the clock is running or not could be informative as to whether the ball is in play during a football game. Furthermore, certain times during a sporting event are particularly important, such as two minutes before the end of a professional football game. Likewise, optical character recognition can be used to determine the names of the actors, characters, and/or other significant persons in a television program or the like simply by reading the credits at the beginning and/or end of the program.

Furthermore, video analytics software 210 is available that can analyze other visual content of a video or multimedia stream to determine subject matter information, e.g., indoors or outdoors, presence or absence of cars and other vehicles, presence or absence of human beings, presence or absence of non-human animals, etc. In fact, software is available today that can be used to actually recognize specific individuals by analyzing their faces.

Even further, there may be significant metadata contained in a multimedia stream. While a closed captioning stream may be considered metadata, we here refer to additional information. Particularly, the makers or distributors of television programs or third party providers sometimes insert metadata into the stream that might be useful in determining the subject matter of a program or of a portions of a program. Such metadata may include almost any relevant information, such as actors in a scene, timestamps identifying the beginnings and ends of various segments within a program, the names of the teams in a sporting event, the date and time that the sports event actually occurred, the number of the game within a complete season, etc. Accordingly, the segmentor 205 also may include software 211 for analyzing such metadata.

Even further, companies now exist that provide the services of generating and selling data about sporting events, television programs, and other events. For instance, Stats, Inc. of Northbrook, Ill., USA sells such metadata about sporting events. Thus, taking a baseball game as an example, the data may include, for instance, the time that each half inning commenced and ended, data for each at bat during the game, such as the identity of the batter, the result of the at-bat, the times at which the at-bat commenced and ended, the statistics of each player in the game, the score of the game at any given instance, the teams playing the game, etc. Accordingly, another software module 212 can be provided to analyze data obtained or otherwise obtained from external sources, such as Stats, Inc.

Furthermore, the aforementioned optical character recognition (OCR) of the game clock in a sporting event also would be very useful in terms of aligning the game time with the media stream time. For instance, external data available from sources such as Stats, Inc. includes data disclosing the time during the game that certain events (e.g., plays) occurred, but generally does not contain any information correlating the game time to the media stream time index. Thus, an alignment algorithm 213 for correlating game time with data stream time also would be a useful software component for purposes of identifying cohesive segments in connection with at least certain types of multimedia content, such as timed sports competitions.

Furthermore, external data is widely available free of charge. For instance, additional subject matter information may be obtained via the Internet. Particularly, much information about sporting events and television shows is widely available on the Internet from any number of free sources. For instance, synopses of episodes of many television shows are widely available on the Internet, including character and actor lists, dates of first airing, episode numbers in the sequence of episodes, etc.).

The present invention may rely on any or all of these techniques for determining the subject matter of a media item as well as the beginning and end of coherent segments corresponding to a particular subject matter. Also, as previously noted, different subject matter information gathering processes for different knowledge domains may use different sets of these tools and/or use them in different ways or combinations. Furthermore, as previously mentioned, the same technologies in segmentor 205 may be used to determine the knowledge domains (i.e., the more general subject matter) of assets in embodiments in which such information is not predetermined so that the system can choose the particular set of technologies and particular attribute/value sets adapted to that knowledge domain for carrying out the segmentation.

It should be noted that the classification of media items need not be exclusive. For instance, a given segment may be properly assigned two or more relatively disparate contextual information within the ontology. For instance, a television program on the History Channel having a portion pertaining to the origination of the sport of golf in Scotland may be classified as pertaining to all of (1) history, (2) travel, and (3) sports.

It should be understood, that the example above is simplified for purposes of illustrating the proposition being discussed. In actuality, of course, a segment about the history and origins of golf in Scotland would be classified and sub-classified to multiple levels according to an ontology. For instance, in a robust ontology, this segment would not be merely classified under history, but probably would be further sub-classified under European history, and even further sub-classified under Scottish history, etc. It would further be classified not merely under travel, but probably under travel, then sub-classified under European travel, and then even further sub-classified under Scottish travel, etc. Finally, it also would not merely be classified under sports, but, for instance, under sports and further sub-classified under solo sports, and even further sub-classified under golf.

The segmentation also need not necessarily be discrete. Segments also may overlap. For instance, the same show on the History Channel mentioned above may start with a segment on Scottish history that evolves into a segment on the origins of golf and that even further evolves into a segment on Scottish dance music. Accordingly, a first segment may be defined as starting at timestamp 5 minutes:11 seconds in the program and ending at timestamp 9 m:18 s classified under History:European:Scotland. A second segment starting at 7 m:39 s and ending at 11 m:52 s may be classified under Sports:Solo:Golf and a third segment starting at 11 m:13 s and ending at 14 m:09 s may be classified under Music:Dance:Scottish. In this example, the various segments overlap each other in time.

Even further, a segment can be any length, including zero (i.e., it is a single instant in time within the media item).

The ones of the various information gathering processes used to analyze a particular media item and the manner of their use may be customized as a function of the knowledge domain of the particular item. The system operator may predetermine a plurality of subject matter information gathering processes, each adapted to a particularly relevant, popular, or common knowledge domain for assets within its collection of media assets and/or are popular interests among the expected users of the system (e.g., subscribers of a television service network employing the system or advertisers on that television network). A more generic, default information gathering process can be used for media items whose knowledge domain either cannot reasonably be determined or that do not fall into any of the other knowledge domain customized processes.

For instance, if the present invention is to be implemented on a subscription-based television service network, then the plurality of knowledge domains to which the ontology, subject matter information gathering processes, and/or attribute sets are customized should be specifically adapted for the types of media assets that commonly comprise television programming. For instance, the vast majority of network television programs fall in to one of a relatively small number of categories or knowledge domains. For instance, probably the vast majority of programs made for television fall into one of the following domains: news and current events, situational comedies, law-based dramas, police-based dramas, medical-based dramas, reality TV, reality competitions, sports competitions (which might further be broken down into a handful of the most popular sports, such as football, hockey, baseball, basketball, soccer, golf), children's cartoons, daytime soap operas, educational or informative (history, travel, technology), sketch comedy, talk shows, and game shows.

Hence, a specialized portion of the ontology, a specialized set of attributes, and/or a specialized subject matter information gathering process can be developed and used for each of these knowledge domains.

Once the segments are determined and the subject matter information has been gathered, the segments are then stored in the segment database 203 with all of their applicable attribute/value pairs.

It should be understood that the media assets themselves do not necessarily need to be physically separated into distinct files at the segment level in database 203. For instance, the database 203 may merely comprise data identifying the segments.

The segments also are indexed in accordance with the ontology 202. Again, if the overall system is to be used for a specific type of media, e.g., a television programming, then the overall ontology preferably is specifically adapted to classifying that type, e.g., multimedia items common to television programming. Furthermore, as previously noted, distinct portions of the ontology pertaining to different knowledge domains within television programming content may be specifically adapted to those knowledge domains.

In addition to simply populating the segment database 203 with the data for a plurality of media segments, those segments also are indexed under the ontology, i.e., the ontology is populated with the segments, as illustrated in oval 215. Finally, as illustrated by oval 216, the ontology can now be used to determine the relevance of any media segment classified therein to any other media segment classified therein not merely by classification (e.g., an "is a" relationship), but by any number of relations.

Using the ontology to identify related concepts and keywords, an improved search algorithm can be developed in connection with a particular subject matter by incorporating such related concepts and/or keywords in the searching algorithm.

In accordance with a very simple embodiment of the present invention, for instance, the searching algorithm may simply develop a search string (a set of words) to plug into a pre-existing search engine. In this simple embodiment, the system will identify keywords derived from the subject matter of the media content using the tools discussed above. Then the ontology is consulted to identify related concepts and/or keywords. For instance, in the football example above, the ontology would disclose that an "interception" is a subcategory or child concept of the concept/keyword "turnover". It also would disclose that sister forms of turnover to an "interception" include "fumbles" and "safeties". The algorithm may also go down one level in the ontology to determine child concepts/keywords within the category of "interception" that may be useful search terms to add to the search string. Even further, the algorithm may look for other relations, rules, and/or restrictions, such as "interception" "may happen" on a "tipped pass," etc.

In a slightly more complex embodiment, the various concepts/keywords developed through analysis of the ontology may be given different weights in terms of finding relevant documents. For instance, in a simple embodiment of this feature, those concepts/keywords not found directly through the subject matter analysis of the asset or segment being consumed, but identified as related concepts via the ontology may be given a lower weight in the search algorithm. In more complex embodiments, concepts from one level above may be weighed differently than sister concepts within the same level, which may be weighed differently than child concepts/keywords found by looking down one level in the ontology.

Of course, the present invention is not limited to simply identifying related keywords for insertion into a search string. The present invention can be utilized to identify related concepts/keywords within the ontology and then incorporate those concepts/keywords in any type of searching algorithm, not just keyword searching.

Another way to use the present invention in connection with a system such as the system disclosed in U.S. patent application Ser. No. 12/274,452 for automated searching for media content having subject matter similar to the subject matter of a particular media piece is to directly use the ontology to find other media content that is indexed within the ontology similarly to the indexing of the particular piece.

Figure 3:
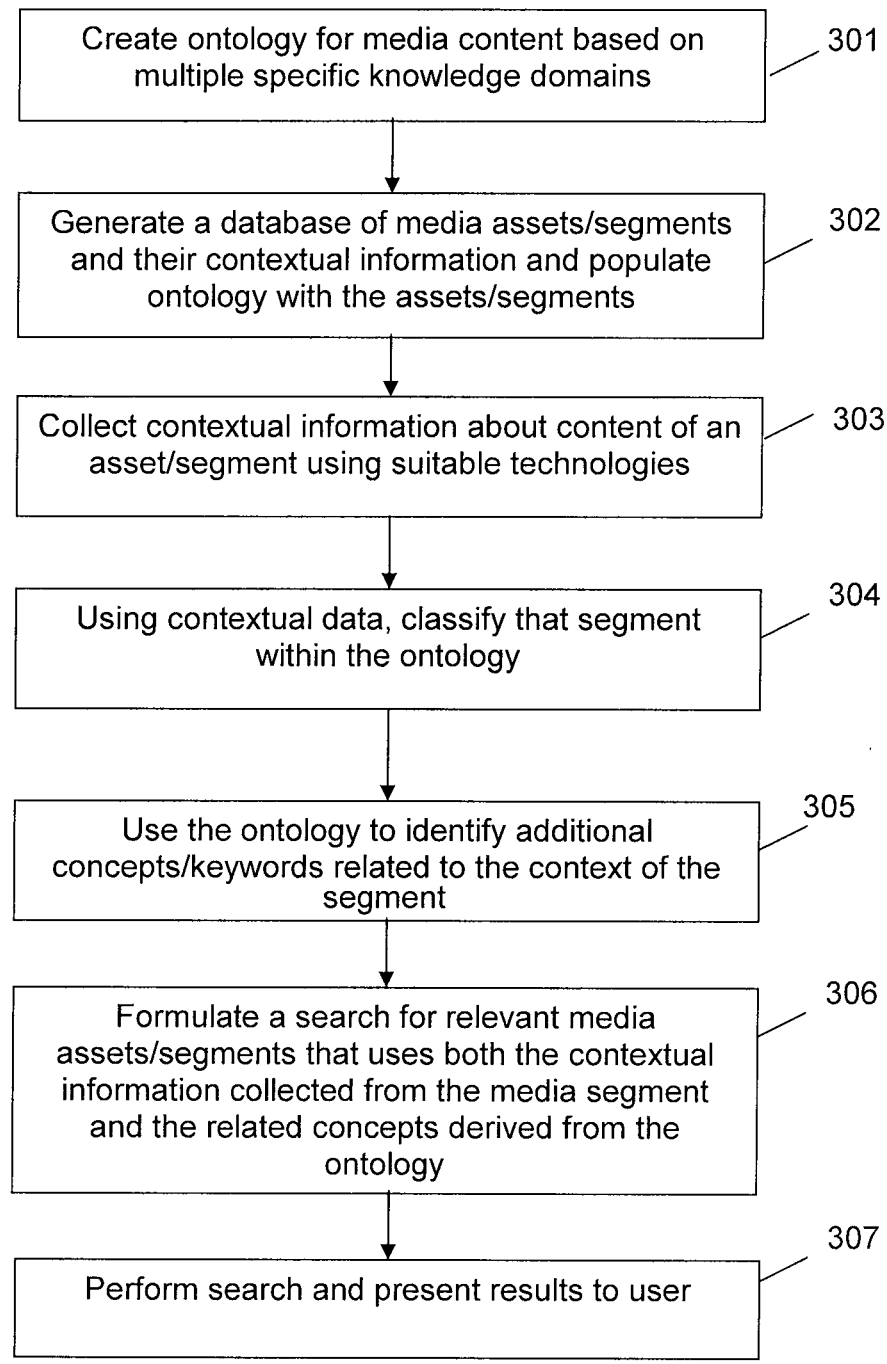
FIG. 3 is a flow diagram illustrating operation in accordance with an embodiment of the present invention.

FIG. 3 is a flowchart illustrating process flow in accordance with the principles of the present invention in an exemplary embodiment of an automated search feature such as the one disclosed in aforementioned U.S. patent application Ser. No. 12/274,452. In accordance with that flow, in step 301, an ontology is created specifically adapted to a specific type of media content. The overall ontology is adapted to its particular task, e.g., a subscription-based television service provider would adapt its ontology for multimedia content, and specifically the typical television programming type of multimedia content. On the other hand, a music service provider, e.g., an online radio station, might use a very different ontology specifically adapted for audio content, and more specifically music content. Furthermore, the ontology preferably is developed with different portions thereof based on different knowledge domains, each particularly adapted to a different specific knowledge domain. Again, using the television network service provider as an example, the ontology can have within it different portions specifically adapted for sports games, cooking shows, situation comedies, reality shows, game shows, etc. If the larger domain is music, the specific knowledge domains might instead be rock, jazz, rhythm & blues and classical.

In any event, next, in step 302, a database is built storing the subject matter information for a plurality of media items. Furthermore, the ontology is populated with the media items, i.e., the various media items are classified within the ontology. The subject matter information and classification information for the library of media items can be collected, for instance, in the ways described hereinabove, including speech recognition analysis, OCR analysis, closed caption analysis, metadata analysis, audio analytics, video analytics, external data, etc.

Next, in step 303, the media item that is currently being consumed is analyzed using any or all of the various aforementioned technologies to determine the subject matter of that media item. Next, in step 304, the item being consumed is classified within the ontology. In step 305, the ontology is analyzed to determine additional concepts and/or keywords relevant to the subject matter information for the media item being consumed. Next, in step 306, a search is formulated for other media items having similar subject matter information to the item being consumed using the subject matter information collected directly from the media item as well as the related concepts and key words derived from the analysis of the ontology.

Finally, in step 307, the search is performed and the viewer is presented with the results of the search.

It should be understood that the exemplary embodiments disclosed herein in connection with automated searching for related content to a media item being consumed by a viewer is merely exemplary. The concepts of the present invention can be applied in many other contexts. For instance, it can be applied to a search, such as an Internet search, developed by a human user when there is an available ontology relevant to the knowledge domain of the search. Particularly, the search terms or keywords input into a search engine by a human user can be run through that ontology to identify additional related terms according to the ontology and then an enhanced search string can be developed for use in performing the actual search (with or without making the human user aware of the modification).

In yet another embodiment, the ontology can be used to determine the relevance to each other of any two or more media segments already classified within the ontology. This embodiment might be useful in connection with tasks such as automatically generating playlists pertaining to a particular subject matter.

Even further, it is not even necessary that any content be previously indexed within the ontology. An ontology itself (completely devoid of anything actually being indexed thereunder) would still provide robust information as to the relatedness of concepts within the ontology. Therefore, an ontology can be used to help improve the parameters used to search for content relevant to any particular topic within the knowledge domain of the ontology in the complete absence of any content actually being indexed under the ontology. The existence of content indexed actually under the ontology would make it easier to locate and identify relevant content since the act of identifying other related concepts within the ontology would inherently also identify the corresponding content indexed under those related concepts in the ontology.

Furthermore, it should be understood by those of skill in the art that, while most of the embodiments discussed hereinabove use exemplary media units of segments at the sub-asset level, this is merely exemplary. The present invention can be used in connection with the classification, searching, and identifying of media items in units of any size (both physically and conceptually), including the sub-asset level, the asset level, or any other units.

In at least one preferred embodiment of the invention, all of the media items 201 are stored in a digital memory as digital files. The ontology and the segment database also are stored in a computer or other digital memory. The various subject matter information gathering modules are preferably implemented as software routines running on a general or special purpose digital processing device. However, the processes also could be implemented in any of a number of other reasonable manners, including, but not limited to, integrated circuits, combinational logic circuits, field programmable gate arrays, analog circuitry, microprocessors, state machines, and/or combinations of any of the above. The mechanisms for formulating the search strategy as well as the mechanism for performing the search also are preferably implemented as software routines, but also could be implemented in any of the aforementioned manners.

By designing the ontology, the subject matter information gathering process and/or the attribute/value pairs for the segment database particularly for a plurality of different specific knowledge domains based on a robust knowledge of each such knowledge domain (e.g., cooking, football, sitcoms, law dramas), one can provide much richer and more robust search and retrieval functionality for users.

The ontology 202 can be continuously refined as types of programming, products, services, demographics, etc. are developed or themselves become more refined.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method comprising:
   determining, by one or more computing devices, a search query by:
      deriving one or more first words based on an analysis of video or audio of audiovisual content,
      determining one or more second words based on one or more relationships that are defined at a location in an ontology, the location corresponding to at least one of the one or more first words, and the one or more relationships associating the at least one of the one or more first words to the one or more second words,
      assigning a first weight to the at least one of the one or more first words, and
      assigning a second weight, which is different from the first weight, to at least one of the one or more second words;
   determining, using the search query, one or more audiovisual content segments; and
   causing display of information associated with the one or more audiovisual content segments.

2. The method of claim 1, wherein the determining, using the search query, the one or more audiovisual content segments comprises searching for one or more matching audiovisual content segments that have an attribute matching at least one of the one or more first words or at least one of the one or more second words, and wherein each of the one or more matching audiovisual content segments comprises a segment of content at a sub-asset level.

3. The method of claim 1, wherein a first relationship of the one or more relationships is a parent-child relationship between a particular first word of the one or more first words and a particular second word of the one or more second words, and wherein the difference between the first weight and the second weight is dependent on the parent-child relationship.

4. The method of claim 1, wherein a first relationship of the one or more relationships is a sibling relationship between a particular first word of the one or more first words and a particular second word of the one or more second words.

5. The method of claim 1, further comprising:
storing a plurality of attribute sets, each attribute set of the plurality of attribute sets comprising one or more attributes, and each attribute set of the plurality of attribute sets corresponding to one of a plurality of knowledge domains;
determining a particular knowledge domain of the plurality of knowledge domains for the audiovisual content;
selecting a specific process for determining subject matter data as a function of the particular knowledge domain for the audiovisual content; and
selecting a set of attributes from the plurality of attribute sets as a function of the particular knowledge domain for the audiovisual content,
wherein the analysis of the video or audio of the audiovisual content comprises performing the specific process for determining the subject matter data and determining values for the set of attributes based on the audio or video of the audiovisual content.

6. The method of claim 5, wherein determining the particular knowledge domain for the audiovisual content comprises determining the particular knowledge domain for the audiovisual content based on a title of the audiovisual content.

7. The method of claim 1, wherein the audiovisual content comprises multimedia assets.

8. The method of claim 1, wherein the audiovisual content comprises television programming.

9. The method of claim 1, wherein the analysis of the audio or video of the audiovisual content comprises at least one of the following: analyzing audio within the audiovisual content for non-speech subject matter data, performing speech recognition on audio within the audiovisual content, performing optical character recognition on video of the audiovisual content, or performing video analytics on video of the audiovisual content.

10. A method comprising:
responsive to receiving a signal indicating activation of a search function during consumption of audiovisual content:
deriving one or more first words based on an analysis of video or audio of the audiovisual content;
determining, by a computing device, one or more second words based on one or more associations for at least one of the one or more first words in an ontology;
assigning a first weight to the at least one of the one or more first words;
assigning a second weight, which is different from the first weight, to at least one of the one or more second words;
determining one or more audiovisual content segments using the at least one of the one or more first words, the at least one of the one or more second words, the first weight, and the second weight; and
causing display of information associated with the one or more audiovisual content segments.

11. The method of claim 10, wherein the determining the one or more audiovisual content segments comprises searching for one or more matching audiovisual content segments that have an attribute matching at least one of the one or more first words or at least one of the one or more second words, and wherein each of the one or more matching audiovisual content segments comprises a segment of content at a sub-asset level.

12. The method of claim 10, wherein a first association of the one or more associations is a parent-child relationship between a particular first word of the one or more first words and a particular second word of the one or more second words, wherein the difference between the first weight and the second weight is dependent on the parent-child relationship.

13. The method of claim 10, wherein a first association of the one or more associations is a sibling relationship between a particular first word of the one or more first words and a particular second word of the one or more second words.

14. The method of claim 10, further comprising:
storing a plurality of attribute sets, each attribute set of the plurality of attribute sets comprising one or more attributes, and each attribute set of the plurality of attribute sets corresponding to one of a plurality of knowledge domains;
determining a particular knowledge domain of the plurality of knowledge domains for the audiovisual content;
selecting a specific process for determining subject matter data as a function of the particular knowledge domain for the audiovisual content; and
selecting a set of attributes from the plurality of attribute sets as a function of the particular knowledge domain for the audiovisual content,
wherein the analysis of the video or audio of the audiovisual content comprises performing the specific process for determining the subject matter data and determining values for the set of attributes based on the audio or video of the audiovisual content.

15. The method of claim 14, wherein the determining the particular knowledge domain for the audiovisual content comprises determining the particular knowledge domain for the audiovisual content based on a title of the audiovisual content.

16. The method of claim 10, wherein the audiovisual content comprises multimedia assets.

17. The method of claim 10, wherein the audiovisual content comprises television programming.

18. The method of claim 10, wherein the analysis of the audio or video of the audiovisual content comprises at least one of the following: analyzing audio within the audiovisual content for non-speech subject matter data, performing speech recognition on audio within the audiovisual content, performing optical character recognition on video of the audiovisual content, or performing video analytics on video of the audiovisual content.

19. A method comprising:
determining, by one or more computing devices, a search query by:

deriving one or more first words based on an analysis of video or audio of audiovisual content, and determining one or more second words based on one or more associations for at least one of the one or more first words in an ontology;

performing a search for audiovisual content segments using the search query; and causing display of one or more results of the search.

20. The method of claim 19, further comprising:

storing a plurality of attribute sets, each attribute set of the plurality of attribute sets comprising one or more attributes, and each attribute set of the plurality of attribute sets corresponding to one of a plurality of knowledge domains;

determining a particular knowledge domain of the plurality of knowledge domains for the audiovisual content;

selecting a specific process for determining subject matter data as a function of the particular knowledge domain for the audiovisual content; and selecting a set of attributes from the plurality of attribute sets as a function of the particular knowledge domain for the audiovisual content;

wherein the analysis of the video or audio of the audiovisual content comprises performing the specific process for determining the subject matter data and determining values for the set of attributes based on the audio or video of the audiovisual content.

* * * * *

UNITED STATES PATENT AND TRADEMARK OFFICE
CERTIFICATE OF CORRECTION

PATENT NO. : 9,477,712 B2  Page 1 of 1
APPLICATION NO. : 14/199063
DATED : October 25, 2016
INVENTOR(S) : Chipman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 24 days.

Signed and Sealed this
Twenty-fifth Day of September, 2018

Andrei Iancu
*Director of the United States Patent and Trademark Office*